United States Patent [19]

Jones

[11] 4,448,443

[45] May 15, 1984

[54] CONTINUOUS FORM BOOK PROCESSING KIT

[75] Inventor: Robert A. Jones, Minneapolis, Minn.

[73] Assignee: Catalog Corporation of America, Inc., Burnsville, Minn.

[21] Appl. No.: 335,724

[22] Filed: Dec. 30, 1981

[51] Int. Cl.[3] .................... B42D 15/00; B32B 31/00

[52] U.S. Cl. .................... 281/5; 281/31; 229/68 R; 156/277; 493/324

[58] Field of Search .................... 283/79; 281/31, 5, 9, 281/12; 282/11.5 R, 11.5 A, 15 B, DIG. 1; 229/74, 68 R; 156/277, 384; 493/188, 324, 325, 347, 382

[56] References Cited

U.S. PATENT DOCUMENTS

| | | | |
|---|---|---|---|
| 1,428,747 | 9/1922 | Borreson . | |
| 1,601,018 | 9/1926 | Haynes . | |
| 1,760,417 | 5/1930 | Lake . | |
| 2,220,927 | 11/1940 | Zalkind | 229/74 |
| 2,274,909 | 3/1942 | Murray | 229/68 R |
| 3,372,858 | 3/1968 | Brody | 281/31 |
| 3,525,470 | 8/1970 | Carrigan | 229/68 R |
| 3,625,547 | 12/1971 | Burke | 282/23 |
| 3,804,226 | 4/1974 | Ellis | 282/11.5 A X |
| 4,011,985 | 3/1977 | Simson | 229/68 R |
| 4,128,954 | 12/1978 | White | 283/19 X |
| 4,159,129 | 6/1979 | Lockhart | 282/27 R |
| 4,211,434 | 7/1980 | Reese | 282/11.5 A |
| 4,277,089 | 7/1981 | Lockhart | 282/27 R |

*Primary Examiner*—Paul A. Bell
*Assistant Examiner*—John S. Brown
*Attorney, Agent, or Firm*—Dorsey & Whitney

[57] ABSTRACT

A method and continuous form adaptively structured and arranged so as to facilitate the manufacture of book processing kits containing pocket-part books, circulation cards and binding labels. The method comprising printing the multi-part form on a paperstock that is compatible with a computer controlled printer, printing the requisite data in the appropriately allotted positions, and disassembling the form into its appurtenent parts. The continuous form is printed in a multi-color format and contains four book processing kits per sheet, and which kits are arranged and bounded by perforations therethrough.

2 Claims, 2 Drawing Figures

CONTINUOUS FORM BOOK PROCESSING KIT

BACKGROUND OF THE INVENTION

The present invention relates to book processing kits and, in particular, to an improved method and continuous form for making the various components of the kits and printing the identifying data on the various components.

Librarians, in performing their various duties, have long been faced with the tedious task of having to prepare the various volumes of their collections for cataloging. While the task subsumes many sub-tasks, in particular, it requires a great deal of time and manual labor to prepare the pocket parts and labels that are affixed to each volume. Typically, this task requires the individual typing of the identification data descriptive of each individual volume (i.e. title, author and call number) not only on each pocket but also on each circulation card and the labels that are affixed to the spine of each volume.

Not only have librarians suffered, but also the suppliers that supply the book processing kits to the libraries. Specifically, each of the components of each kit must be separately fabricated and inventoried. Each component is typically fabricated by printing a plurality thereof on a suitable paperstock that is subsequently cut so as to individually segment the components, thus requiring three separate production runs to produce the pocket, pocket-part back and circulation card contained in each book processing kit. Also, because each component is individually fabricated, it is necessary to individually type in the requisite data.

The present invention, however, reduces the preparation process down to that of only having to affix the book processing kit components to the individual volumes. That is, the pocket-part back to the pocket and the book, the labels to the book's spine and the insertion of the circulation card into the attached pocket. All the prior manual steps having been performed by various machine processes that are readily adaptable to the inventively structured book processing kit form.

These advantages and others will become more apparent, however, upon a reading of the following description and upon reference to the following drawings.

SUMMARY OF THE INVENTION

An improved method and continuous form for preparing book processing kits. The continuous form comprising a plurality of pocket-part backs, circulation cards and spine labels that are arranged on a suitable paperstock that is compatible with a computer controlled printer. The kit components are each arranged so as to be bounded on at least one side by perforations that are let into the paperstock. The components are also appropriately colored and printed such that each page of the continuous form can be dissassembled into a plurality of perforatedly adjoining book processing kits. The kits are further arranged on the continuous form such that each volume's identification data can be printed in the appropriate positions on each kit's components, via a computer controlled printer.

Also included on the continuous form are the piggyback labels that are typically affixed to the spines of the identified volumes. The labels are arranged within segmented areas on the continuous form, adjacent each circulation card, such that they too can be printed, prior to removing the labels from the stub.

DESCRIPTION OF THE PREFERRED EMBODIMENT

Figure 1:
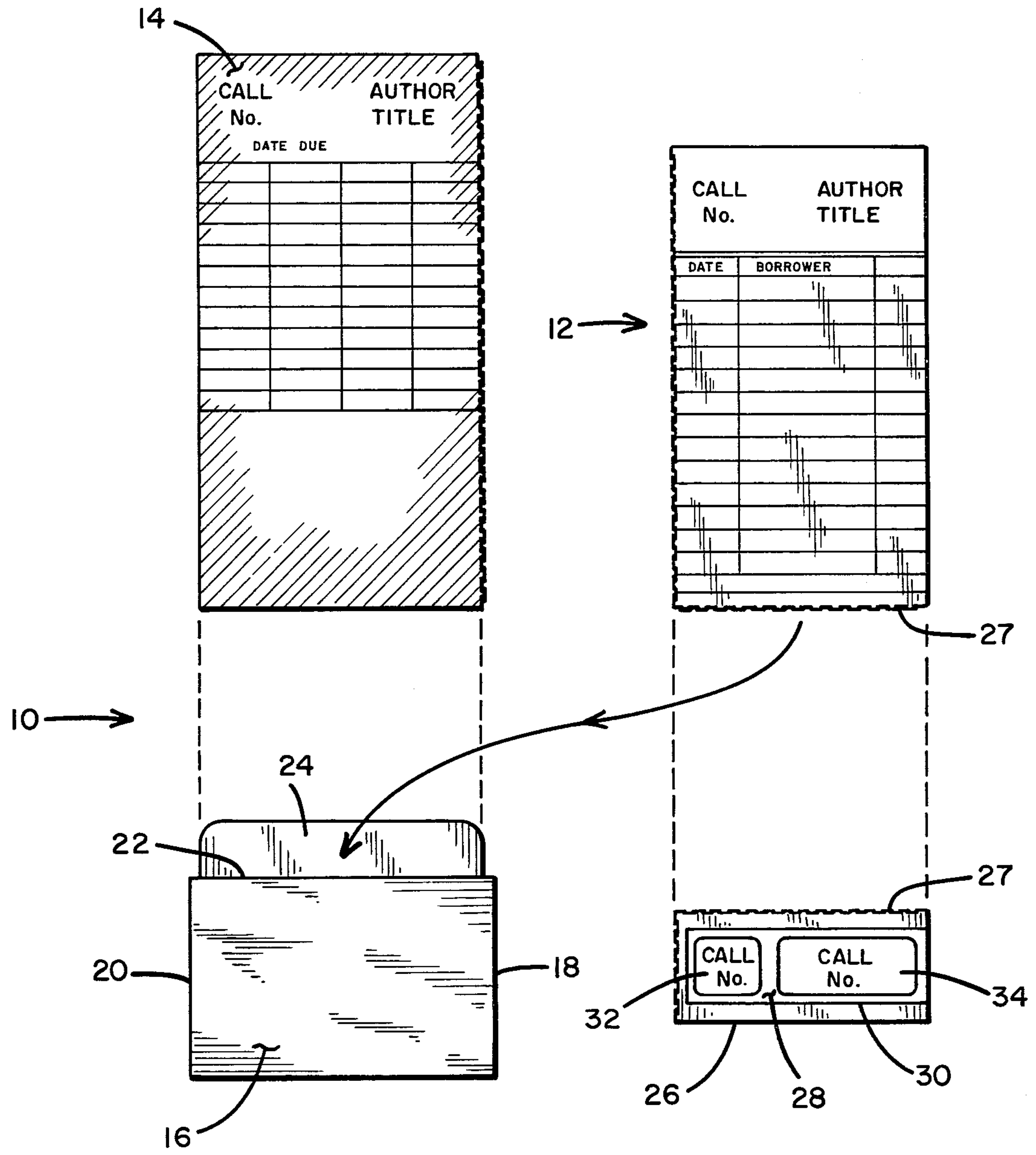
FIG. 1 is a view showing the library card and the pocket part detached from the continuous form.

The book processing kits that are produced via the present invention can be seen upon reference to FIG. 1. In particular, each kit is comprised of a pocket part 10 and a circulation card 12. The pocket part 10, in turn, is comprised of a pocket-part back 14 and a half pocket 16. While half pocket and whole pocket circulation card holders are well known, they are fabricated as unitary structures. Typically, the pockets are formed by cutting the desired paperstock into the desired shape and folding the flaps (not shown) that are provided along the right, left, and top edges 18, 20 and 22 so as to form a reinforced pocket, upon gluing the flaps at the right and left fold edges 18 and 20 to the back 24 of the pocket. The back 24 of the pocket, depending upon its length, then determines whether or not the pocket is a half or whole pocket. The reinforcement, in turn, is provided by the double thickness that occurs along the fold line 22.

As mentioned, historically, book processing pocket-parts have been formed as unitary structures. The type of pocket-parts that are used in any given library is primarily dependent upon the procedure employed in the specific library. In particular, where the library stamps the "due date" on the pocket-part 10, as well as on the circulation card 12, most generally a full length or whole pocket is used. In such cases, the back 24 of the pocket-part 10 is then printed with appropriate vertical and horizontal lines so as to produce a plurality of segments, wherein the librarian can stamp the due date, each the book is loaned out.

The pocket-part 10 of the present invention, however, utilizes the well known half pockets 16 in conjunction with a separate pocket-part back 14. Such a separate pocket-part back 14 thus, permits the librarian to either permanently affix the pocket-part back 14 to the back 24 of the half pocket 16, or not, as desired.

The pocket-part back 14, like the circulation card 12, in the space provided at the top of the card 14 is printed with the proper information identifying the author, title and call number for the respective volume in which the pocket-part back 14 is to be contained or to which it is to be attached. It is also to be noted that the type of call number used is dependent upon the classification system employed in the library, most typically the Dewey Decimal System, and may also indicate the Library of Congress number.

The circulation card 12, which typically is retained by the librarian, is divided via printed vertical and horizontal lines so as to segment the card into a plurality of areas wherein the librarian can identify the due date and the "borrower's name". Thus, the circulation card 12 is retained by the librarian, while the pocket-part back 14 remains with the volume so as to notify the user of the due date.

It should be noted that the circulation card 12 of the present invention differs from the typical circulation card in that it additionally contains a detachable portion or stub 26, that is detachable at the perforation 27. The detachable stub 26, in turn, contains a piggyback label 28 that is affixed thereto. The piggyback label 28 is comprised of a carrier 30 and two labels 32 and 34, that are each attached to the piggyback label 28 by a suitable adhesive. The label 28, in turn, is permanently attached to the detachable stub 26 by an adhesive. The labels 32 and 34, however, are detachable so that they may be removed from the carrier 30 and be attached to the book's spine. The labels 32 and 34 are also of different sizes, so as to accommodate the different length call numbers that are encountered.

While it is apparent that the book processing kit of FIG. 1 can be supplied to the librarian in a blank form, most typically and as will become more apparent hereinafter, the pocket-part back 14, the circulation card 12 and the labels 32 and 34 will be preprinted. The printing is accomplished by a computer controlled printer that prints the proper identification data in the appropriate positions on the pocket-part back 14, circulation card 12 and labels 32 and 34. The Telemarc TM system sold by the assignee of the present invention performs such a function and can be purchased by the library. In the alternative, a library can order book processing kits, already printed as per the library's data base, corresponding to the library's collection. In either event, the librarian need then only attach the preprinted pocket part 10 and the labels 32 and 34 to the identified volume, without having to perform all the heretofore tedious tasks of individually typing the data on each pocket part, circulation card and label.

Figure 2:
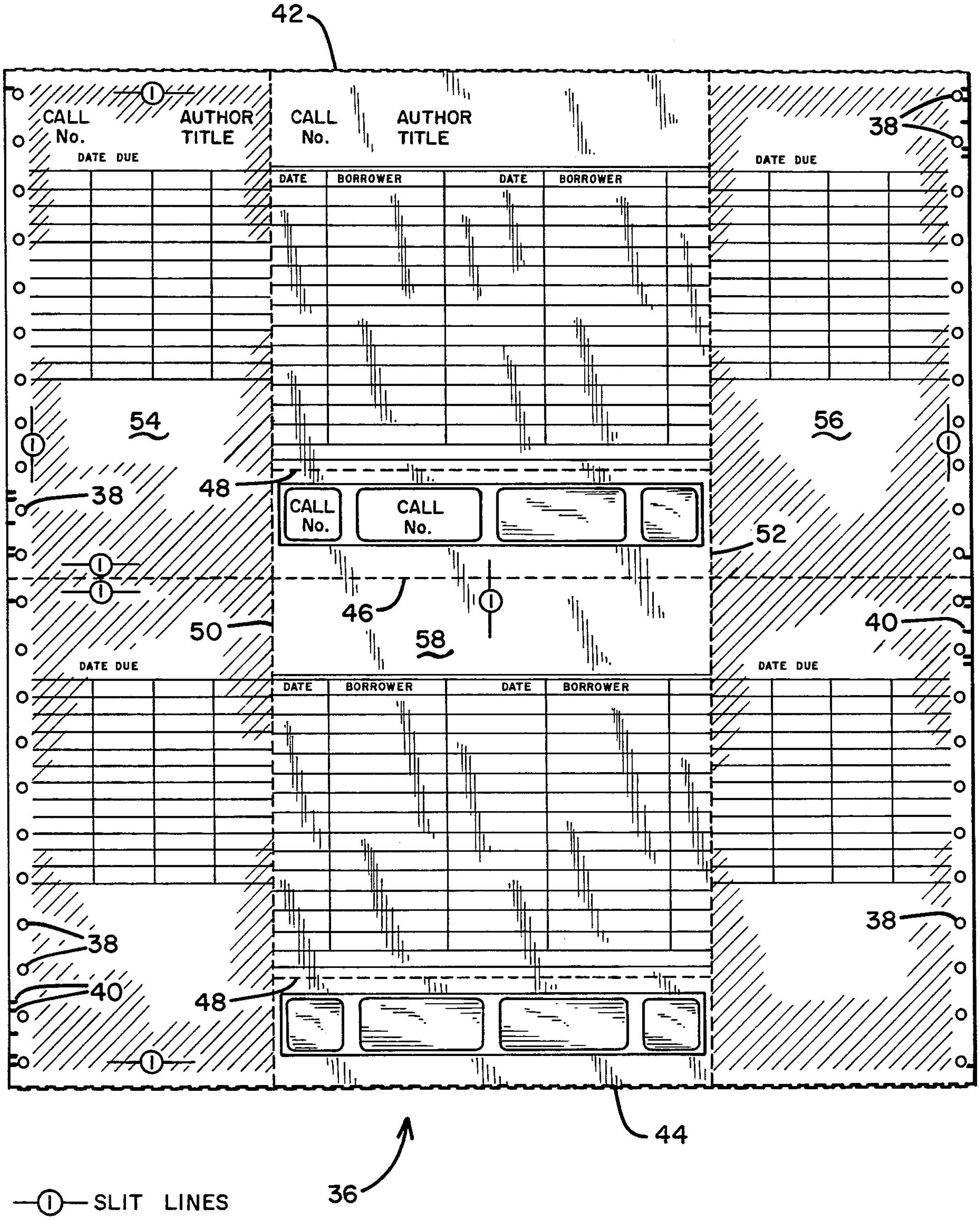
FIG. 2 is a view of the continuous form book processing kit.

Referring now to FIG. 2, one sheet or page is shown of the continuous form from which the individual book processing kits of FIG. 1 are derived. The form of FIG. 2 is printed on each sheet 36 of a computer printer compatible paperstock. Each sheet 36, most typically, is fabricated from a 125 pound tag weight paperstock and each sheet 36 is approximately 14½ inches wide by 14 inches long. Each sheet 36 contains a plurality of evenly spaced line holes 38 and a plurality of index markers 40 on the right and left sides thereof and which line holes 38 and index markers 40 respectively facilitate the computer printing and slitting of the form by ensuring that the paperstock is properly aligned relative to the computer printer and slitter and that the printer and slitter are aware of the relative position of each sheet as it is processed. Typically, the paperstock is also perforated along lines 42 and 44 at the respective top and bottom of each sheet 36. These perforations, facilitate the stacking of the continuous form within shipping cartons. Also, it is to be noted that each sheet of paperstock is further perforated along the horizontal lines 46 and 48 and the vertical lines 50 and 52. These perforations, in turn, facilitate the subsequent assembly of the book processing kits.

Upon preparing the paperstock, it is next processed within a suitable printing press, such as a four color offset printing press, so as to print the proper colors and form format. It is to be noted though that the above referenced perforations and line holes 38 can also be produced with such a printing press. During the printing process, a continuous roll of the paperstock is printed in a continuous fashion so as to produce a multicolor format. In particular, a vanilla colored ink is laid down in the shaded areas 54 and 56, between the index holes 38 and the perforations 50 and 52 of the left and right sides of each sheet 36. While the coloring is continuous in the areas 54 and 56, the printing press does produce a border at the top and bottom of each sheet 36, and which borders are subsequently removed.

After the coloring step, the paperstock appears in the two color format of vanilla and white, since the paperstock itself is white. The printing press, next, prints the required form format within the colored areas 54 and 56 and the white area 58. In particular, and for each sheet 36 four pocket-part backs 14 are printed in the vanilla colored areas 54 and 56, two per each area, and four circulation cards 12 are printed in the white area 58. And, the circulation cards 12 are each printed adjacent to a pocket-part back 14. Thus, the white area 58 on each half of the sheet 36, relative to the perforation 46, contains two circulation cards 12 and two pocket-part backs 14. Further, the printed matter is aligned relative to the perforations 46, 48, 50 and 52 so that each sheet 36 of the printed continuous form can subsequently be disassembled into the four book processing kits.

As should be apparent, the separation process is facilitated via the perforations 46, 48, 50 and 52. Prior to describing this disassembly process, however, it should be noted that each sheet 36 of the continuous form is also printed on its reverse side. Specifically, the circulation card 12 format is printed in its mirror image, directly opposite the front side of the circulation cards 12 so that additional space is provided for indicating due date, borrowers name and other pertinent information on the back of the circulation cards 12.

It is also to be noted that prior to disassembly, the piggyback label 28 is laid down onto the circulation cards 12 in the appropriate positions thereon. This may be performed via a separate step that ensures that the label 28 is properly indexed relative to the printed form and the perforations 50, 52, 44, 46 and 48.

The thus prepared continuous form is next ready for printing by an appropriate computer printer so as to individually print each pocket-part back 14 and the immediately adjacent circulation card 12 and label 28 with the appropriate author, title and call number information. This printing step, as mentioned, can be performed by a system that has been programmed with the appropriate software. The printing itself is achieved by any suitable computer driven printer. Such printers are readily adaptable to the printed continuous form and accurately reproduce the identification data on the respective pocket-part backs 14, circulation cards 12 and labels 32 and 34 with the aid of the index holes 38. While only the book processing kit in the upper left hand corner of FIG. 2 shows the typical areas that are printed, it is to be recognized that typically each kit is printed with its own unique identification data.

Upon printing the appropriate identification data, each sheet of the continuous form is then ready for disassembly, and which is achieved via a Bowe slitter or other appropriate cutter that slits each sheet 36 of the form along the slit lines 1 so as to disassemble each sheet 36 into four book processing kits. Each pocket-part back 14 and corresponding circulation card 12, however, remain attached to one another, via the perforations 50 and 52, thereby ensuring that the pocket-part backs 14 and circulation cards 12 do not become mixed up, after printing, and which if it happened for a large collection would require the horrendous task of sorting and matching the appropriate cards.

The thus prepared book processing kits are then further disassembled by the librarian into the individual components, as previously mentioned, and attached to the identified volume with the aid of the separately procured half pocket 16.

The thus prepared continuous form and kits reduce the heretofore tedious task of manually identifying the volumes of a library's collection into the relatively easy and straight forward task of merely having to affix the individual book processing kits to the correspondingly identified volumes. It should be noted too that the above continuous form is readibly adaptable to previously used systems and methods, so that by merely using the blank book processing kits, which are still joined at the perforations 50 and 52, a library can manually type in the appropriate information. Thus, a library can purchase blank sheets 36 or half sheets for subsequent use with new volumes or when replacing pocket parts that are damaged.

It is also to be noted that present process is readibly adaptable to printing a number of circulation cards 12 or pocket-part backs 14 onto each sheet of a printed continuous form, where a user only wants one of the other portions of a book processing kit. Most typically, this will occur where the library orders extra circulation cards 12 for subsequent use as the original circulation cards 12 become filled, and which replacement circulation card 12 can be preprinted or left blank so that they can be prepared by the library.

While the present invention has been described in particularity with respect to its preferred embodiment, it is to be recognized that other embodiments or variations thereof may suggest themselves to one skill in the art upon a reading hereof. Therefore the present invention should be interpreted to include those equivalent embodiments contained within the spirit and scope of the following claims.

What is claimed is:

1. A pre-printed continuous form containing a plurality of book processing kits, wherein said book processing kits are printed on a paperstock having a plurality of line holes formed therein and index marks printed on each of the side edges thereof for permitting the controlled feeding and indexing of the paperstock in a computer controlled line printer that appropriately prints book identification data on each of the form parts, each of said book processing kits comprising:

(a) a pocket part back for adhesive attachment to and for identifying a unique one of a plurality of books and having a plurality of printed vertical and horizontal columns and lines within which the due date of the book may be manually entered upon loaning the book to a borrower;

(b) a circulation card having a plurality of printed vertical and horizontal columns and lines for correspondingly identifying the book identified by said pocket-part and for providing the library with a retainable record of the due date and borrower's name;

(c) a removable stub containing at least one removable piggyback adhesive label that identifies and is for attachment to said identified book; and wherein (d) said pocket part back is semipermanently attached to said circulation card and said stub along an adjacent edge of each and said stub is also semipermanently attached to said circulation card along a common edge of each, whereby all the parts of each of said kits may be simultaneously and automatically prepared for subsequent manual separation and mounting in the correspondingly identified books.

2. A method for making book processing kits comprising:

(a) preparing a web of paper stock having a plurality of line holes and index marks on the side edges thereof for ensuring the proper printing alignment of the web relative to a computer controlled line printer;

(b) perforating said paper stock horizontally and vertically so as to define a plurality of kit segments, each kit having at least a detachable pocket part back, a circulation card and a book identification stub;

(c) printing a color over substantially all of said pocket part back;

(d) printing a plurality of horizontal and vertical lines on said pocket part back and said circulation card so as to respectively partition spaces for due dates on said pocket part back and due dates and borrower names on said circulation card;

(e) affixing a piggyback adhesive label to said book identification stub;

(f) printing identification data via a computer controlled line printer in appropriate positions on each of said book processing kits so as to identify a unique one of a plurality of books within a library's collection on each of said book processing kits; and (g) slitting the data containing web of paperstock so as to divide it into said plurality of book processing kits, whereby said book processing kits may be manually disassembled and mounted within their correspondingly identified book.

* * * * *